United States Patent [19]

Yuge

[11] Patent Number: 5,285,870
[45] Date of Patent: Feb. 15, 1994

[54] LUBRICATION ARRANGEMENT FOR AUTOMATIC POWER TRANSMISSION

[75] Inventor: Kazuyoshi Yuge, Shizuoka, Japan

[73] Assignee: Jatco Corporation, Japan

[21] Appl. No.: 869,060

[22] Filed: Apr. 16, 1992

Related U.S. Application Data

[63] Continuation of Ser. No. 567,649, Aug. 15, 1990.

[51] Int. Cl.$^5$ .............................................. F01M 1/02
[52] U.S. Cl. ................................ 184/6.12; 184/6.28; 475/159
[58] Field of Search ........................ 184/6.12, 6.28, 31; 74/467; 475/116, 127, 159; 192/113 B; 418/170

[56] References Cited

U.S. PATENT DOCUMENTS

| | | | |
|---|---|---|---|
| 2,328,104 | 8/1943 | Simpson | 184/6.12 |
| 2,403,579 | 7/1946 | Carpenter | 184/6.12 |
| 3,013,848 | 12/1961 | Terry | 418/170 |
| 3,053,115 | 9/1962 | Cartwright et al. | 184/6.12 |
| 3,321,999 | 5/1967 | Greer | 475/159 |
| 3,618,712 | 11/1971 | Casey | 184/6.28 |
| 4,098,382 | 7/1978 | Reedy et al. | 475/159 |
| 4,235,127 | 11/1980 | Kemper | 475/159 |
| 4,241,622 | 12/1980 | Kubo et al. | 475/159 |
| 4,573,373 | 3/1986 | Shimizu et al. | 184/6.12 |
| 4,663,989 | 5/1987 | Brodbeck | 475/159 |
| 4,760,759 | 8/1988 | Blake | 475/159 |
| 4,856,273 | 8/1989 | Murray | 184/6.11 |
| 4,874,069 | 10/1989 | Lederman | 192/113 B |

Primary Examiner—Richard R. Cole
Assistant Examiner—Alan B. Cariaso
Attorney, Agent, or Firm—Ronald P. Kananen

[57] ABSTRACT

A lubricating arrangement for an automatic power transmission has a lubricant circuit for communication between a pressurized fluid source and a component of the automatic power transmission to be lubricated. A flow restriction means is disposed within the lubricating circuit. The flow restriction means incorporated in the lubricating arrangement introduces a twin choke construction for providing sufficient magnitude of flow restriction for the lubricating fluid supplied from the pressurized fluid source for preventing excess fluid from flowing through the lubricating circuit which causes a drop of supply pressure and/or flow rate in the pressurized fluid source and blocking of the fluid flow path due to accumulation of foreign matters, such as dust, dirt and so forth. The flow restriction means comprises a first choke and a second choke arranged in tandem fashion across a fluid reservoir provided therebetween.

3 Claims, 1 Drawing Sheet

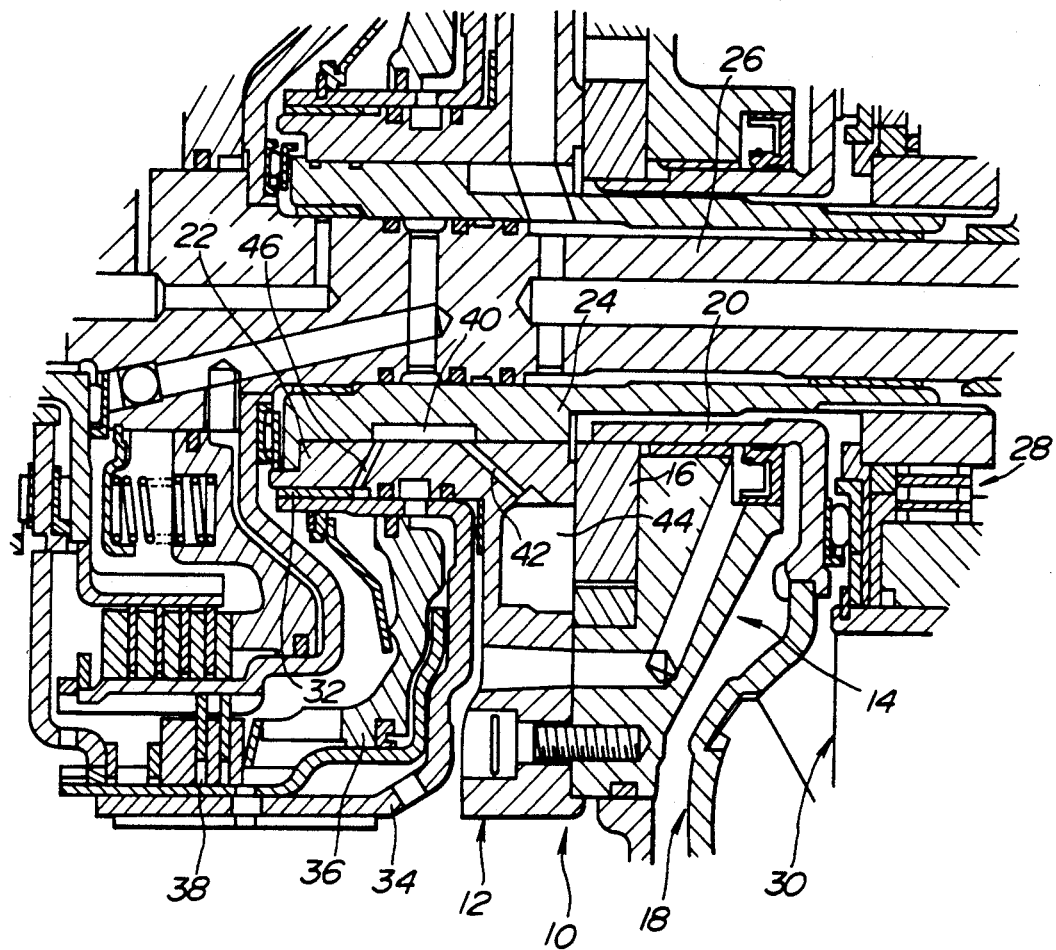

LUBRICATION ARRANGEMENT FOR AUTOMATIC POWER TRANSMISSION

This application is a continuation of application Ser. No. 07/567,649 filed Aug. 15, 1990.

BACKGROUND OF THE INVENTION

1. Field of the Invention

The present invention relates generally to an automatic power transmission for an automative power train. More specifically, the invention relates to a lubricant circulating arrangement for an automatic power transmission for circulating lubricating fluid for lubricating components of the automatic power transmission.

2. Description of the Background Art

In general, an automatic power transmission includes a lubricating circuit for circulating pressurized lubricating fluid therethrough for lubricating necessary components. For this purpose, lubricating fluid flowing back via a pressure relief valve or from an oil cooler, is recirculated, as illustrated in Japanese Patent First Publication No. 62-62047, for example. Separately from the above, pressurized lubricant fluid from a pressurized fluid source can be directly used for lubrication. In the latter case, in order to prevent an excess amount of lubricating fluid from flowing through a lubrication circuit, a flow restriction device is provided therein. As a flow restriction device, a choke is generally used for a high flow restriction capacity.

However, when the choke is used in the lubricating circuit, an excess amount of lubricating fluid can flow into the lubricating circuit. Particularly, when the lubricating fluid is at a high temperature and thus has a low viscosity, such tendency is increased. As a result, lack of lubricating fluid pressure or flow rate can be caused in the pressurized fluid source. On the other hand, when excess amount of lubricating fluid is supplied in the lubricating circuit, frictional resistance due to viscosity of the lubricating fluid is increased. Reduction of a possibility of excess flow of the pressurized lubricating fluid can be obtained by utilizing smaller path area choke. However, reduction of the path area of the choke is practically difficult because of difficulty in machining. Furthermore, even when a smaller path area choke is technically possible to manufacture, such smaller path area may increase a possibility of blocking due to foreign matters, such as dust, dirt or so forth, contained in the lubricating fluid.

SUMMARY OF THE INVENTION

Therefore, it is an object of the present invention to provide a lubricating arrangement which can solve the problems set forth above.

Another object of the present invention is to provide a lubricating arrangement which can optimize a lubricating fluid flow rate in a lubrication circuit without requiring a reduced diameter for a choke.

In order to accomplish the aforementioned and other objects, a lubricating arrangement for an automatic power transmission, according to the present invention, has a lubricant circuit for communication between a pressurized fluid source and a component of the automatic power transmission to be lubricated. A flow restriction means is disposed within the lubricating circuit. The flow restriction means incorporated in the lubricating arrangement introduces a twin choke construction for providing sufficient magnitude of flow restriction for the lubricating fluid supplied from the pressurized fluid source for preventing excess fluid from flowing through the lubricating circuit which causes drop of supply pressure and/or flow rate in the pressurized fluid source and blocking of the fluid flow path due to accumulation of foreign matters, such ad dust, dirt and so forth. The flow restriction means comprises a first choke and a second choke arranged in a tandem fashion across a fluid reservoir provided therebetween.

According to one aspect of the invention, a lubricating arrangement for an automatic power transmission for lubricating a transmission component comprises:

a pressure source for discharging pressurized lubricating fluid, the pressure source including a discharge port for discharging pressurized lubricating fluid therethrough;

a first choke communicated with the discharge port of the pressure source at one end;

a second choke communicated with the transmission component at one end for supplying lubricating fluid therethrough; and a chamber having a greater fluid path area than the first and second chokes, the chamber being disposed between the first and second chokes with fluid communication with the other ends of the first and second chokes.

In practice, the first and second chokes are arranged in series across the chamber.

According to another aspect of the invention, a lubricating arrangement for an automatic power transmission for lubricating a transmission component comprises;

a cylindrical outer member having the outer periphery associated with the transmission component to be lubricated;

an inner member having the outer periphery firmly fitted onto the inner periphery of the outer member;

a chamber defined between mating surfaces of the inner and outer members;

a pressurized lubricating fluid source for discharging pressurized lubricating fluid through a fluid circuit for supplying line pressure for operating the automatic power transmission in a plurality of mutually different operational modes;

a first choke having a first end communicated with the pressurized lubricating fluid source to introduce therefrom a limited flow rate of pressurized lubricating fluid, and a second end communicated with the chamber for discharging pressurized fluid thereinto; and a second choke having a first end communicated with the chamber for introducing a limited flow rate of pressurized lubricating fluid, and a second end communicated with the transmission component for discharging the pressurized lubricating fluid for lubrication thereof.

Preferably, the lubricating fluid pressure source is arranged at an orientation axially offset from the axial position of the transmission component. Also, it is possible that the inner and outer members are established in a firm fitting for co-rotation with each other. Furthermore, the lubricating fluid pressure source has a housing integrally formed with the outer member so that the inner member can be driven with the outer member carrying the lubricating fluid pressure source. On the other hand, in the preferred construction, the chamber may be defined by a groove formed on at least one of the inner and outer peripheries of the outer and inner members.

According to a further aspect of the invention, a lubricating arrangement for a bushing supporting a clutch drum for rotation comprises a pump unit having a housing;

an outer cylindrical member formed integrally with the housing of the pump unit;

a stator shaft connected to a stator of a torque converter, the stator shaft having a first end portion at an orientation remote from a second end, at which it is coupled with the stator, the stator shaft having at the first end portion establishing a firm fitting with the outer cylindrical member for co-rotation therewith;

a chamber defined between the inner periphery of the outer cylindrical member and the outer periphery of the stator shaft;

a first choke orifice having a first flow restrictive fluid flow path area and defined through the outer cylindrical member, the first choke orifice having a first end communicated with the pump unit for introducing part of pressurized lubricating fluid therethrough, and a second end communicated with the chamber; and a second choke orifice having a second flow restrictive fluid flow path area and defined through the outer cylindrical member, the second choke orifice having a first end communicated with the chamber and a second end communicated with the bushing for lubrication thereof.

BRIEF DESCRIPTION OF THE DRAWINGS

The present invention will be discussed in detail herebelow and from the accompanying drawings of the preferred embodiment of the invention, which, however, should not be taken to limit the invention to the specific embodiment or embodiments, but are for explanation and understanding only.

In the drawings:

The sole Figure illustrates the major part of the preferred embodiment of a lubricating arrangement for an automatic power transmission, according to the present invention.

DESCRIPTION OF THE PREFERRED EMBODIMENT

Referring now to the drawing, there is illustrated a part of an automatic power transmission incorporating the major part of the preferred embodiment of a lubricating arrangement, according to the present invention. As can be seen from the drawings, an oil pump 10 has a first pump housing member 12 and a second pump housing member 14. The first and second housing pump members 12 and 14 are assembled to each other to define a rotor housing space. A rotor 16 is disposed within the rotor housing space. The rotor 16 is so coupled with a torque converter 18 as to be rotatingly driven by a sleeve 20 of the torque converter.

The first housing pump member 12 is integrally formed with a cylindrical section 22. A stator shaft 24 is pressed into the interior space of the cylindrical section 22. The outer periphery of the stator shaft 24 is tightly fitted onto the inner periphery of the cylindrical section 22 so that the stator shaft can be fixedly secured on the cylindrical section of the first pump housing member 12.

An input shaft 26 is supported in the stator shaft 24. The stator shaft 24 also supports a stator 30 via an one-way clutch 28. A bushing 32 is secured on the outer periphery of the cylindrical section 22 in the vicinity of the inner end thereof. With the bushing 32, a clutch drum 34 is rotatably supported thereon. A piston 36 and a clutch plate assembly 38 and so forth are housed within the interior space of the clutch drum 32. A communication groove 40 is formed on the outer periphery of the stator shaft 24 at an orientation where the cylindrical section is firmly fitted with the inner periphery of the first pump housing member 12. The communication groove 40 is communicated with a discharge port 44 via a first choke orifice 42. On the other hand, the communication groove 40 is communicated with a clearance where the aforementioned bushing 32 is arranged via a second choke orifice 46.

With the shown construction, while the rotor 16 is rotatingly driven, high pressure lubricating fluid is constantly discharged through the discharge port 44. Part of the pressurized lubricating fluid in the discharge port 44 flows into the communication groove 40 via the first choke orifice 42. Then, the pressurized lubricating fluid in the communication groove 40 is supplied to the bushing 32 via the second choke orifice 46.

As can be appreciated herefrom, since the first and second choke orifices 42 and 46 are arranged in tandem fashion across the communication groove 40 which serve as the fluid reservoir, the lubricating fluid flow rate supplied to the bushing 32 cannot become excessive. This, on the other hand, assures a sufficiently high level line pressure for controlling the automatic power transmission over a plurality of operational modes corresponding to a variety of driving ranges.

According to the shown construction, since the twin choke arrangement is per se effective for providing a substantial flow restriction for the pressurized lubricating fluid, it becomes unnecessary for reducing the fluid path area of respective choke orifices. This makes manufacturing easier.

Therefore, the present invention fulfills all of the objects and advantages sought therefor.

While the present invention has been discussed in terms of the preferred embodiment of the invention, which are intended to facilitate full understanding of the invention and to enable implementation of the invention, the invention should not be appreciated to be specified to the specific construction set forth above. The invention can be embodied in various fashion. Therefore, the invention should be understood to include all possible embodiments and modifications thereof which can be implemented without departing from the principal of the invention set out in the appended claims.

What is claimed is:

1. A lubricating arrangement for an automatic power transmission comprising:

an oil pump having a first pump housing member and a second housing member connected to said first pump housing member to define a space, and a rotor disposed within said space, said first housing member being formed with a discharge port and having an integral cylindrical section;

a stator shaft inserted into said cylindrical section and being formed with a groove closed by said cylindrical section to form a fluid reservoir;

a drum rotatably supported on said cylindrical section;

a bushing disposed between said cylindrical section and said drum;

said cylindrical section being formed with a first orifice disposed between said discharge port and said fluid reservoir to provide restricted fluid communication therebetween, said cylindrical section being formed also with a second orifice disposed between said fluid reservoir and said bushing to provide a restricted fluid communication between said fluid reservoir and said bushing.

2. A lubricating arrangement as claimed in claim 1, wherein said groove with which said stator shaft is formed extends in a longitudinal direction of said stator shaft.

3. A lubricating arrangement as claimed in claim 2, wherein said groove is disposed radially inwardly with respect to said discharge port and said bushing.

* * * * *